United States Patent [19]
Fukuyama et al.

[11] Patent Number: 5,334,830
[45] Date of Patent: Aug. 2, 1994

[54] SCANNING OPTICAL MICROSCOPE HAVING A COMPACT CONFOCAL OPTICAL SYSTEM FOR ADJUSTING POSITION OF APERTURE

[75] Inventors: Hiroya Fukuyama, Sagamihara; Hisao Kitagawa; Mitsunori Yamamoto, both of Tokyo; Shingo Kashima, Sagamihara, all of Japan

[73] Assignee: Olympus Optical Co., Ltd., Tokyo, Japan

[21] Appl. No.: 4,458

[22] Filed: Jan. 14, 1993

Related U.S. Application Data

[63] Continuation-in-part of Ser. No. 863,408, Apr. 3, 1992, Pat. No. 5,225,671.

[30] Foreign Application Priority Data

May 29, 1991 [JP] Japan .................. 3-126054
Jul. 31, 1992 [JP] Japan .................. 4-205382

[51] Int. Cl.[5] .............................................. H01J 3/14
[52] U.S. Cl. ..................................... 250/216; 250/234
[58] Field of Search ................... 250/216, 234, 235; 359/197, 745, 381, 384

[56] References Cited

U.S. PATENT DOCUMENTS

| | | |
|---|---|---|
| 3,013,467 | 12/1961 | Minsky . |
| 4,063,814 | 12/1977 | Rhodes .................. 250/234 |
| 4,734,578 | 3/1988 | Horikawa . |
| 4,827,125 | 5/1989 | Goldstein ............... 250/216 |
| 4,893,008 | 1/1990 | Horikawa .............. 250/234 |
| 5,065,008 | 11/1991 | Hakamata et al. ..... 250/216 |
| 5,086,222 | 2/1992 | Shibuya . |
| 5,101,295 | 3/1992 | Lichtman et al. . |
| 5,153,428 | 10/1992 | Ellis ....................... 250/234 |

FOREIGN PATENT DOCUMENTS

| | | |
|---|---|---|
| 61-140914 | 6/1986 | Japan . |
| WO90/00755 | 1/1990 | PCT Int'l Appl. . |
| 2184321 | 11/1989 | United Kingdom . |

OTHER PUBLICATIONS

"Theory and Practice of Scanning Optical Microscopy", by T. Wilson et al, Academic Press 1984; pp. 2–3, 70–73, London.

"Confocal Microscopy", by T. Wilson, Academic Press 1990, pp. 94–99.

*Primary Examiner*—David C. Nelms
*Attorney, Agent, or Firm*—Frishauf, Holtz, Goodman & Woodward

[57] ABSTRACT

A laser beam from a light source is reflected by a beam splitter and two galvanomirrors, and enters a pupil projection lens. The beam passing through the lens forms a spot on an image plane of an objective. This spot is two-dimensionally scanned by shaking the galvanomirrors with respect to their axes perpendicular to each other. Reflected light or fluorescence from a sample is returned to the beam splitter through the same path, passes through it, and is then reflected by a mirror. This optical system includes an optical unit which can be inserted/removed therein/therefrom. When the optical unit is removed, the optical system serves as a confocal optical system. When the optical unit is inserted, the optical system serves as a nonconfocal optical system. In the confocal optical system, the beam from the mirror enters a condenser, converges, passes through an iris and enters a photomultiplier tuber. The condenser includes a convex lens and a concave lens. In the nonconfocal optical system, the beam from the mirror enters a condenser, converges and is focused on the iris to a spot. The beam passing through the iris enters the photomultiplier tube.

11 Claims, 9 Drawing Sheets

SCANNING OPTICAL MICROSCOPE HAVING A COMPACT CONFOCAL OPTICAL SYSTEM FOR ADJUSTING POSITION OF APERTURE

CROSS REFERENCE TO THE RELATED APPLICATION

This application is a continuation-in-part, of U.S. patent application Ser. No. 07/863,408 filed on Apr. 3, 1992 now U.S. Pat. No. 5,225,671, issued Jul. 6, 1993.

BACKGROUND OF THE INVENTION

1. Field of the Invention

The present invention relates to a scanning optical microscope and, more particularly, to a scanning optical microscope having a confocal optical system.

2. Description of the Related Art

A confocal optical system is an optical system for focusing light to the surface or inside of a sample through a lens to form a minute spot and converging reflected light or fluorescence from the minute spot by a detector, etc. through a minute aperture formed in conjugation with the spot. In this confocal optical system, only the light from a minute spot on a focal plane (hereinafter referred to as a spot) enters the detector through the aperture, but light from before and after the spot is not able to pass through the aperture, nor does it enter the detector.

A scanning optical microscope having this type of confocal optical system scans the minute spot and processes information detected by the detector in synchronization with position information of the minute spot to obtain an image of a spot scanning surface. The spot scanning surface can freely be set inside of an optically transparent sample, and an image of a section of the sample having a specific depth can be formed accordingly. This type of scanning optical microscope has resolution in the direction of an optical axis, and enables a so-called optical slice. The formed image has a good contrast and high resolution since the light from before and after the spot in the direction of the optical axis does not pass through the aperture.

In the confocal optical system, usually, a single convex lens is used as a means for converging the light from the spot. When the focal distance of the convex lens is short, the diameter of a beam waist is very small, i.e., several tens of micrometers. Since, in the confocal optical system, the diameter of an aperture has to correspond to that of the beam waist, if the diameter of the beam waist is very small, it is difficult to optically control the aperture. On the contrary, when the focal distance of the convex lens is long, the diameter of a beam waist is large and that of an aperture is also large. This aperture is therefore easy to optically control, but the confocal optical system is increased in size because of the long focal distance.

Furthermore, a scanning optical microscope is proposed in which a proper amount of light enters a detector through an aperture by virtue of a variable diameter of the aperture thereby to prevent a dark image due to a very small amount of light passing through the aperture from being formed. One example of this scanning optical microscope is disclosed in GB 2184321 B or WO 90/00755. The diameter of the aperture is varied by use of an iris.

The scanning optical microscope is very useful for setting a condition such as positioning of a live sample to be observed and comparison of a sectional image and a total image if a nonconfocal optical system can be used in addition to the confocal optical system. The nonconfocal optical system can be achieved by removing an aperture from the confocal optical system. However, optical control is required whenever the aperture is rearranged to constitute the confocal optical system. There is another possibility that the nonconfocal optical system can be achieved by using an iris and by changing the diameter of the iris. Since, however, the ratio of the maximum diameter of the iris to the minimum diameter thereof is required to be about 10, the nonconfocal optical system cannot be achieved in actuality.

SUMMARY OF THE INVENTION

An object of the present invention is to provide a scanning optical microscope having a compact confocal optical system capable of easily adjusting a position of an aperture or a pinhole.

Another object of the present invention is to provide a scanning optical microscope having a confocal optical system and a nonconfocal optical system and which is capable of easily switching these systems to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description Given above and the detailed description of the preferred embodiments given below, serve to explain the principles of the invention.

DETAILED DESCRIPTION OF THE PREFERRED EMBODIMENTS

An embodiment of the present invention will now be described, with reference to the accompanying drawings.

Figure 1:
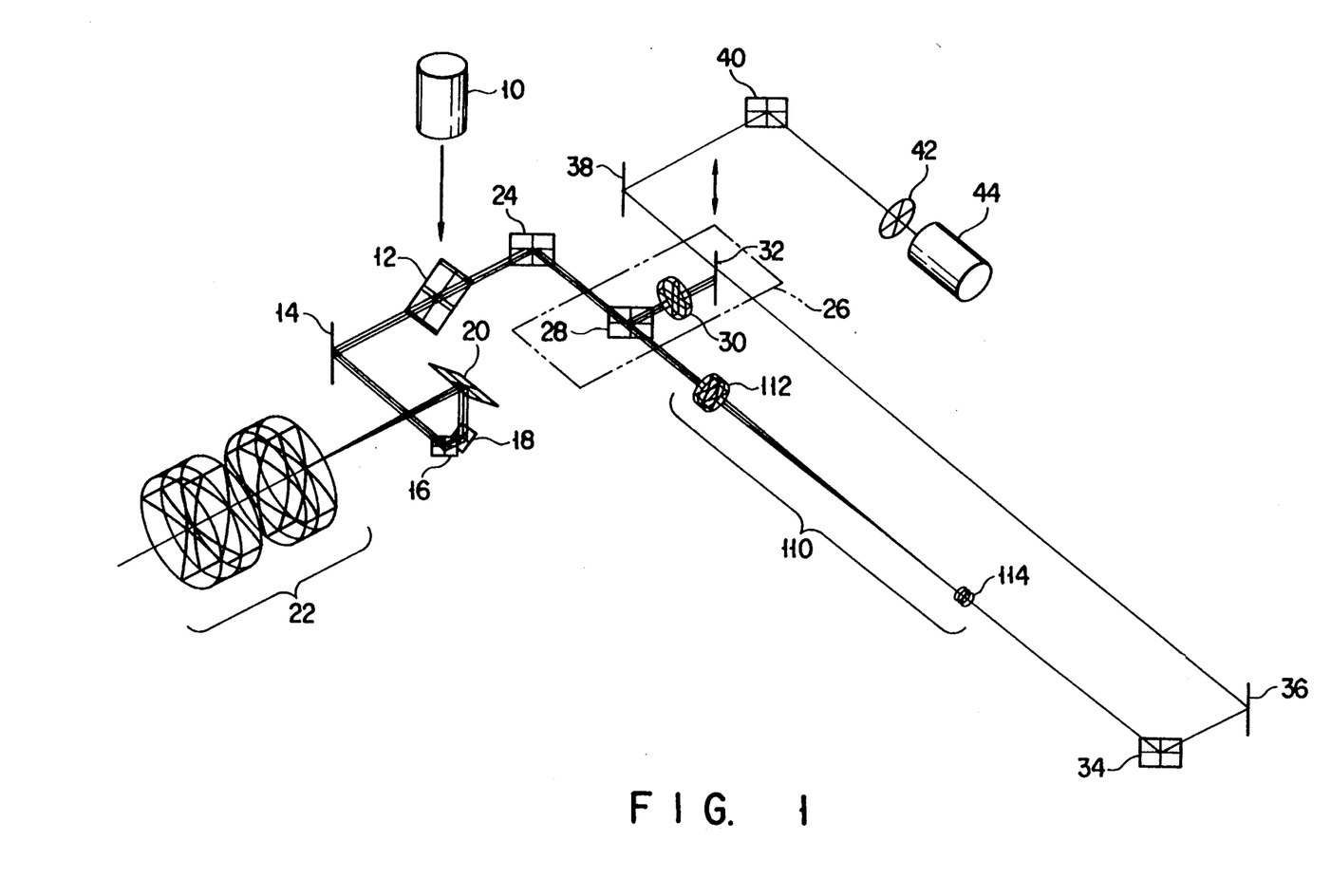
FIG. 1 is a view showing a constitution of an optical system of a scanning optical microscope.

FIG. 1 shows an optical system of a scanning optical microscope. As shown in FIG. 1, a laser beam emitted from a light source 10 is reflected by a beam splitter 12, then reflected by a mirror 14, two galvanomirrors 16 and 18, and a mirror 20 in this order, and enters a pupil projection lens 22. The laser beam passing through the pupil projection lens 22 forms a spot on an image plane of an objective (not shown). This spot is two-dimensionally scanned by oscillation of the two galvanomirrors 16 and 18 whose axes are perpendicular to each other. Reflected light or fluorescence from a sample is returned to the beam splitter 12 through the same path, passes through it, and is then reflected by the mirror 24.

An optical unit 26 surrounded with a two-dot-one-dash line can be inserted in/removed from an optical path of the light beam reflected by the mirror 24 in the directions of arrows in FIG. 1. When the optical unit 26 is removed, the optical system of the embodiment serves as a confocal optical system. When it is inserted, the system serves as a nonconfocal optical system. Thus, the optical unit 26 constitutes a selecting means for selecting the confocal or nonconfocal optical system through which the light beam from the sample passes.

Figure 2:
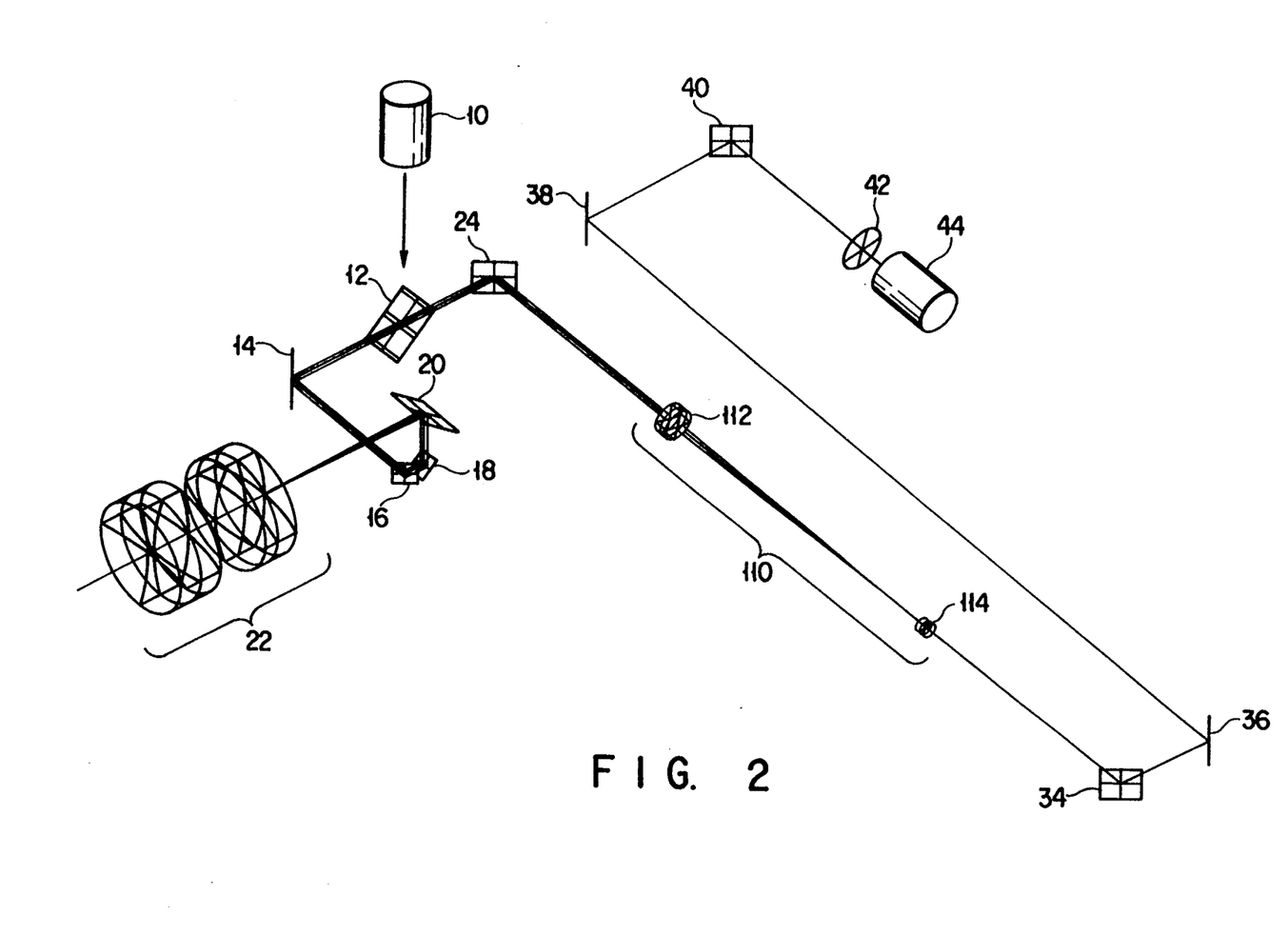
FIG. 2 is a view showing a confocal optical system in the optical system of FIG. 1.

In the confocal optical system, as shown in FIG. 2, the light beam from the mirror 24 passes through a light converging means, such as, a condenser 110, and then is reflected by mirrors 34, 36, 38 and 40 so as to be converged. A spot is thus projected on an iris 42. The light beam then enters a photomultiplier tube 44 from the iris 42. The mirrors 34 and 36 can be oscillated with respect to their axes whose directions are different from each other (for example, their axes which are perpendicular to each other) and the optical axis is adjusted by changing the directions of the axes of the mirrors.

Figure 4:
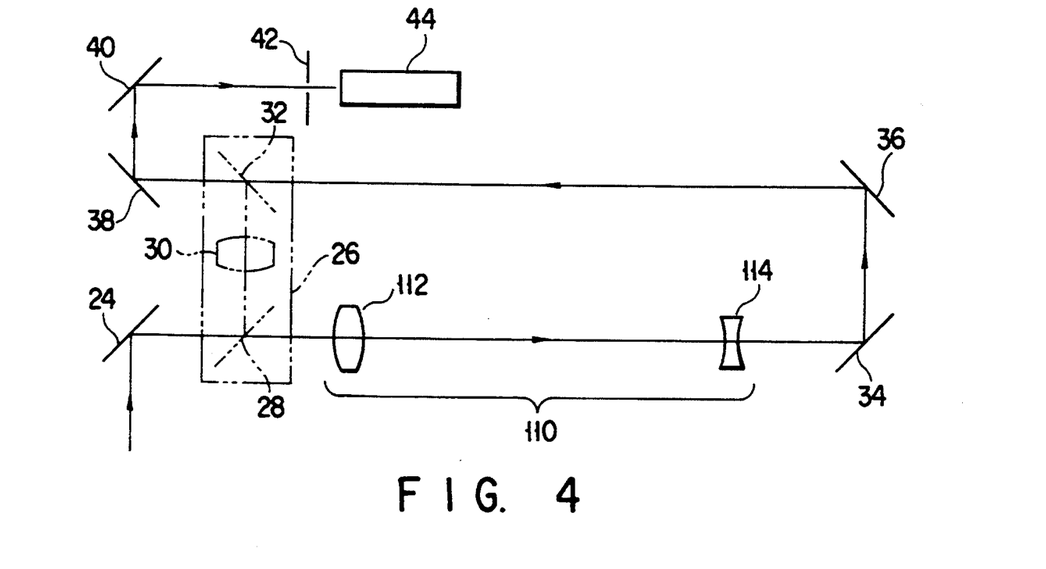
FIG. 4 is a view showing a constitution of a detection optical system in the confocal optical system shown in FIG. 2.
Figure 5:
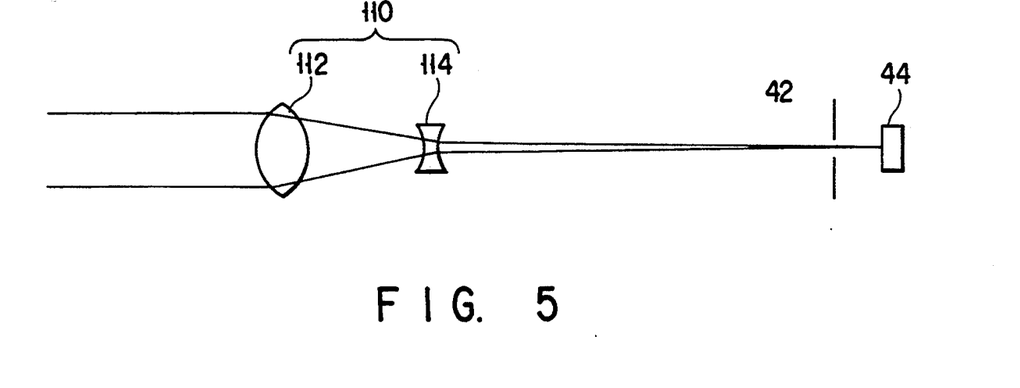
FIG. 5 is a view showing a constitution of a condenser of the optical system shown in FIG. 1.

The condenser 110 includes a convex lens 112 arranged on the light incident side and a concave lens 114 arranged thereafter in the light traveling direction, as shown in FIGS. 4 and and 5. The condenser 110 is a so-called telephoto type. As shown in FIG. 5, an incident light beam is greatly focused by the convex lens 112 to diminish the diameter of the light beam, and then enters the concave lens 114, thereby reducing a degree of the focusing. For this reason, the effective focal distance of the condenser 110 is longer than a distance between the condenser 110 and the actual light converging point. The iris 42 is thus arranged nearer to the condenser 110. The diameter of the waist of the light beam is greater than that of the waist of a light beam focused on the same position by use of a single condenser, and an aperture having a large diameter may be used as an aperture formed by the iris 42. Consequently, the positioning precision required for the iris 42 is mitigated, and the optical axis can easily be adjusted.

The adjustment of the optical axis is executed by using the two mirrors 34 and 36 and is more precise and easier than using a single mirror. If the optical axis is adjusted by a single mirror, for example, it is adjusted in an X-direction and then in a Y-direction perpendicular thereto by moving the same mirror. Therefore, the optical axis is easy to shift in the X-direction and thus difficult to adjust. If the optical system includes no adjustment mechanism, a very high precision is required for parts of the system, and the parts cannot be exchanged in substance. If, however, the optical axis is adjusted by the two mirrors 34 and 36, for example, it can be adjusted by the mirror 34 in one direction and then by the mirror 36 in the other direction. By doing so, the optical axis can be adjusted very easily.

Figure 3:
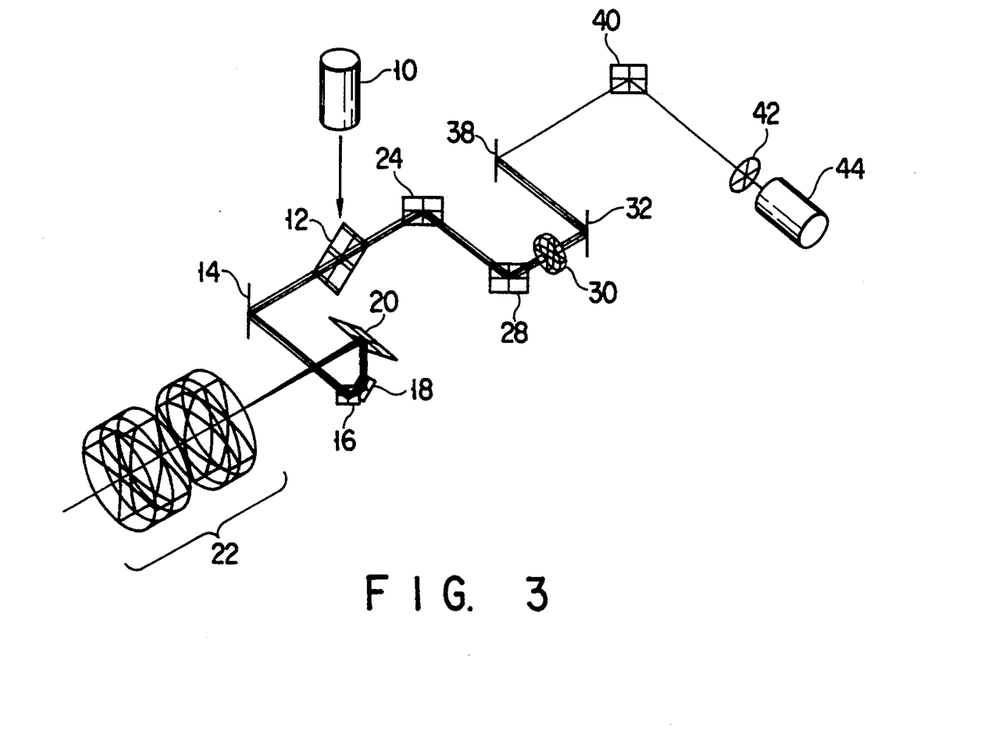
FIG. 3 is a view showing a nonconfocal optical system in the optical system of FIG. 1.

In the nonconfocal optical system, as shown in FIG. 3, a light beam is reflected by the mirror 24, then by the mirror 28, and enters a condenser 30. The light beam passing through the condenser 30 is focused and then reflected by mirrors 32, 38 and 40. A spot is thus projected on the iris 42. The light beam passing through the iris 42 enters the photomultiplier tube 44.

A relationship between the size of a spot and that of a sensor required for achieving a nonconfocal optical system will now be described.

The literature, "Theory and Practice of Scanning Optical Microscopy," p.72, FIG. 3.29 discloses that a shift in position in an optical axis direction (z-direction) is not sensed in a nonconfocal optical system (Type 1). Judging from this literature, a response in the Z-direction can be determined by the distribution of Z-direction intensities of spots formed on a sample by a light beam emitted through an objective. A range within which the response in the z-direction should fall is then considered from an S/N ratio of the optical system. It can be thought that the S/N ratio usually depends upon the quantum resolution of digital data stored in a frame memory for scan conversion. If the digital data is 8-bit data, S/N=256. If it is 10-bit data, S/N=1024. Assuming that the optical system is quantized when 8 bits=256 levels, a defocus spot image has only to be formed since the central intensity of the spot image is decreased to 1/256 of the highest intensity (focal point) thereof. This defocus spot can be obtained by such a complicated calculation as that of the distribution of diffraction intensities, or it can be thought from a calculation of energy distribution that the diameter of the defocus spot is $(256)^{\frac{1}{2}}$, i.e., 16 times as large as that of a spot substantially in focus. Consequently, the sensor for the nonconfocal optical system has only to be $R^{\frac{1}{2}}$ times or more as large as the diameter of the spot in focus when the S/N ratio of the optical system is R.

The projection magnifications of the spots of the confocal optical system shown in FIG. 2 and the nonconfocal optical system shown in FIG. 3 depend upon the ratio of the focal distance $f_{110}$ of the condenser 110 to the focal distance $f_{22}$ of the pupil projection lens 22 and the ratio of the focal distance $f_{30}$ of the condenser 30 to the focal distance $f_{22}$ of the pupil projection lens 22, respectively, since the optical paths from the pupil projection lens 22 to the condensers 110 and 30 are parallel to each other. Since a magnification $M_{ob}$ of the objective (not shown) is added from the sample surface, the projection magnification of the spot projected from the sample surface to the iris 42 is expressed as follows: in the confocal optical system shown in FIG. 2

$$M_{ob} \times f_{110}/f_{22} \qquad (1)$$

in the nonconfocal optical system shown in FIG. 3

$$M_{ob} \times f_{30}/f_{22} \qquad (2)$$

If the magnification of the objective is 60 and the numerical apertures is 1.4, when the wavelength $\lambda = 0.5$ $\mu m$, the diameter of the spot on the sample surface is $1.22 \times 0.5/1.4 = 0.436$ $\mu m$. If this diameter is multiplied by each of the magnifications obtained by the above expressions (1) and (2), the diameter of the spot on the iris 42 can be calculated. Assuming that $f_{110}$ is 4000 mm and $f_{30}$ is 200 mm, the diameter of the spot on the iris 42 of the confocal optical system shown in FIG. 2 is $0.436 \times 10^{-3} \times 60 \times 4000/50 = 2.09$ mm, and the diameter of the spot on the iris 42 of the nonconfocal optical system shown in Fig. 3 is $0.436 \times 10^{-3} 60 \times 200/50 = 0.10$ mm.

If the optical system includes an iris 42 having an aperture whose diameter is larger than 1.6 mm which is 16 ($R^{\frac{1}{2}}$) times as large as that of the spot, and a sensor, the nonconfocal effect can be obtained.

The setting of the diameter $D_p$ of the iris 42 for controlling the confocal effect will be described. According to the literature, "CONFOCAL MICROSCOPY," pp. 94 and 95, if the diameter of the spot in the confocal optical system is $D_A$, about $\frac{1}{8}$ $D_A$ is sufficient for the minimum diameter of the iris. In the confocal optical system, $\frac{1}{8} \times 2.09 = 0.26$ mm is required for the minimum diameter. If an iris having a small diameter is difficult to manufacture, the optical system can be so formed that the single aperture is exchangeably inserted therein. When an iris is used, if its diameter $D_p$ can be varied within the range of 0.125 $D_A \leq D_p \leq 1$, the confocal effect can be sufficiently controlled.

When the optical system is used to detect fluorescence emitted from a live sample such as a cell, there is a drawback in which the intensity of detection light is too low to detect the fluorescence if the diameter of an iris is diminished too much, and there is a demand that the intensity of the detection light be increased at the slight sacrifice of both sectioning effect and ultraresolution effect. It is thus desirable that the range of the iris diameter Dp be changed to $0.32D_A \leq D_P \leq 3.2D_A$ so that the largest one of the iris diameter is ten times as large as that of the smallest one. It is better that the diameter $D_P$ of the iris be made smaller ($0.125$ $D_A D_P \leq 1.25$ $D_A$) to attain high resolution in a sample of high reflectivity such as a semiconductor in the field of industry and larger ($0.32D_A \leq Dp \leq 3.2D_A$) to maintain the high intensity of detection light in a sample for detecting slight fluorescence such as a live sample in the field of biology and medicine. In order to cover both these fields, the foregoing pinhole can be formed, or the spot diameter can be changed using the above-described constitution of the optical system to select the optical system which is the most suitable for the field of industry.

Since, in the above embodiment, the condenser 110 includes a group of two lenses of telephoto type, the actual distance between the condenser 110 and the light converging point is shorter than the focal distance $f_{110} = 4000$ mm, and the optical system can thus be made compact. In the optical system shown in FIG. 4, one of the confocal and nonconfocal optical systems can be selected to switch an observation mode by removing or inserting the optical unit 26, surrounded with a two-dot-one-dash line, in the direction of a normal to the plane of FIG. 4, as has been described above. Since none of the optical components for constituting the confocal optical system are moved, if the optical axis is adjusted by the confocal optical system, the optical axis need not be adjusted by the nonconfocal optical axis with high precision because the aperture in the iris 42 is relatively large, with the result that the problem of a shift in the optical axis does not arise. The condenser 30 can be fixed to the optical unit 26 so as to move together, or it can be provided outside the optical unit 26 so that only the mirrors 28 and 32 move together with the optical unit 26. Taking into consideration a shift in axis of the condenser 30, the latter is preferable to the former.

A first modification to the light converging means used in the confocal optical system will now be described, with reference to FIG. 6. The light converging means of the first modification includes a telephoto type condenser 120 having a convex lens 122 and a concave lens 124 in addition to the telephoto type condenser 110 having the convex lens 112 and concave lens 114. The condenser 120 is arranged behind the condenser 110. An advantage of a lens system having two pairs of telephoto type condensers 110 and 120 will be described below.

First, a lens system of a pair of telephoto type condensers as shown in FIG. 5 will be described. Assuming that the focal distance of the convex lens 112 is 100 mm, the focal distance of the concave lens 114 is $-10$ mm, and the distance between these lenses is about 90 mm, the distance between the convex lens 112 and the iris 42 located on the light converging point is about 350 mm, and the focal distance of the entire lens system is about 3500 mm. Therefore, the telephoto ratio is 0.1 which is obtained by dividing the distance 350 mm by the focal distance 3500 mm ($350/3500 = 0.1$). An optical system having such a small ratio necessitates high precision in processing and assembly of optical components.

Figure 6:
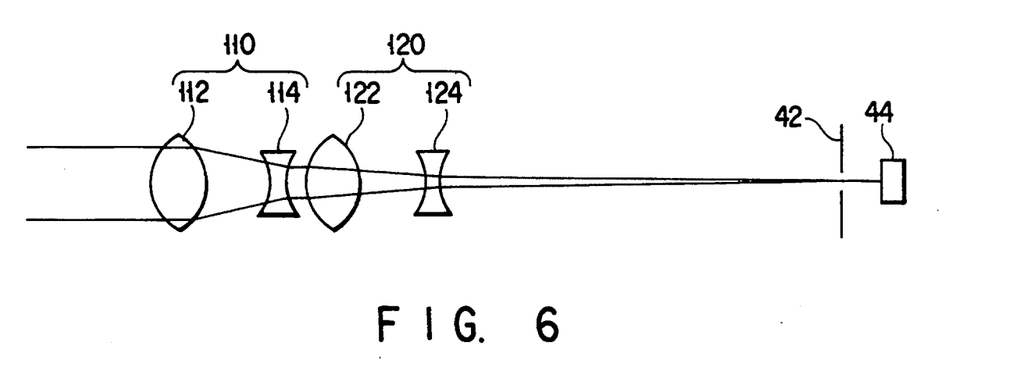
FIG. 6 is a view of a first modification to the condenser shown in FIG. 5.

Next, a lens system of two pairs of telephoto type condensers as shown in FIG. 6 will be described. In this lens system, the focal distance of each of the convex lenses 112 and 122 is 100 mm, the focal distance of each of the concave lenses 114 and 124 is $-33$ mm, and the telephoto ratio of each of the condensers 110 and 120 is 0.32. The condenser 120 is so arranged that the distance between the convex lens 112 of the condenser 110 and the iris 42 located on the light converging point is about 350 mm. The telephoto ratio of the entire lens system having two pairs of condensers 110 and 120 connected to each other is 0.1.

A shift in image corresponding to an inclination of each lens of the above lens systems shown in FIGS. 5 and 6 will be described. The inclination of the convex lens corresponding to the amount of shift (an amount of allowance of shift in axis) of the same image is about 0.17° in the lens system of FIG. 5, and about 5° in the lens system of FIG. 6. The inclination of the concave lens in this case is about 0.17° in the lens system of FIG. 5, and about 0.5° in the lens system of FIG. 6. It can be understood from the inclinations of the lenses that the lens system of FIG. 6 has a wider range of precision in processing and assembly of optical components than that of FIG. 5. Thus, the processing and assembly of the components of the lens system shown in FIG. 6 are easier than those of the components of the lens system shown in FIG. 5 under the same conditions.

In the lens system shown in FIG. 6, the telephoto ratio of each condenser is 0.32. However, the telephoto ratio is not limited to 0.32. It is desirable that the telephoto ratio be set to 0.2 or more in view of processibility and assembly. The number of pairs of condensers used in the lens system can be set to three or more when necessary.

Figure 7:
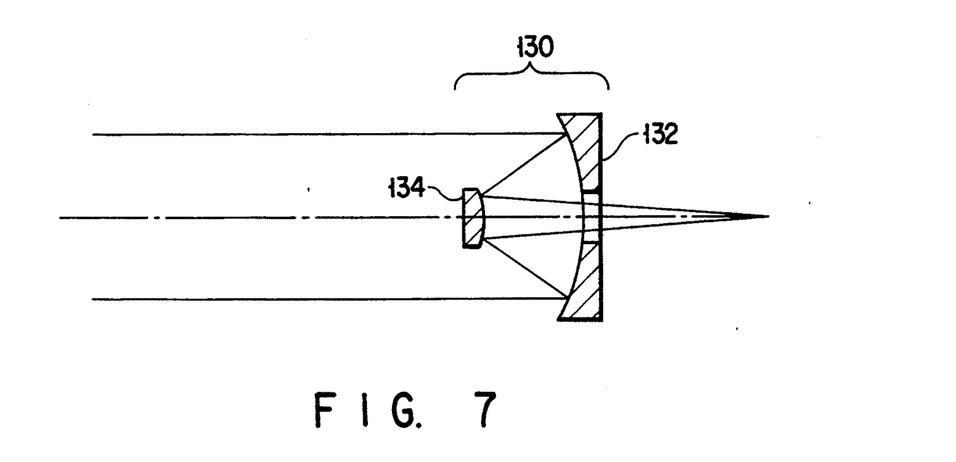
FIG. 7 is a view of a second modification to the condenser shown in FIG. 5.

A second modification to the light converging means used in the confocal optical system will be described with reference to FIG. 7. The light converging means of the second modification includes a reflective lens 130 having two reflective mirrors. One of the reflective mirrors is a concave mirror 132 having an aperture in its central part, and the other reflective mirror is a convex mirror 134 of a small diameter arranged opposite to the concave mirror 132.

Light incident on the light converging means enters the concave mirror 132, except for part of the light intercepted by the convex mirror 134. The light is reflected by the surface of the concave mirror 132 and then enters the convex mirror 134 as a focusing light beam. The light beam incident on the convex mirror 134 is reflected by the surface thereof to lower a degree of focusing. The light beam then passes through the aperture in the concave mirror 132 and is converged behind the concave mirror 132. Like the condensers described above, in the light converging means shown in FIG. 7, the effective focal distance is lengthened without lengthening the distance between the light converging means and its light converging point. Since the mirrors are used in place of lenses, no chromatic aberration occurs, and a light beam having a wider wavelength range can be used.

Figure 8:
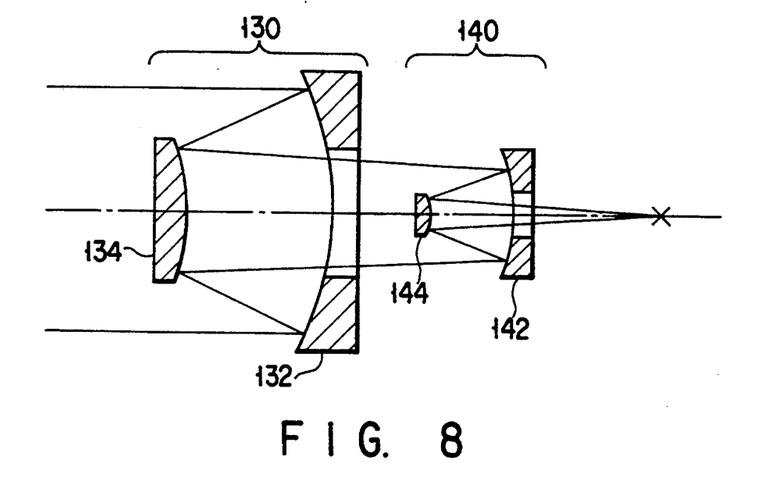
FIG. 8 is a view of a third modification to the condenser shown in FIG. 5.

A third modification to the light converging means used in the confocal optical system will now be described, with reference to FIG. 8. The light converging means of the third modification includes a telephoto type reflective lens 140 arranged behind the telephoto type reflective lens 130 having concave mirror 132 and convex mirror 134. The reflective lens 140 is similar to the reflective lens 130 in that it has a concave mirror 142 and a convex mirror 144 of a small diameter arranged opposite thereto, but they are different in that the diameter of the reflective lens 140 is smaller than that of the reflective lens 130.

Light enters the concave mirror 132, except for part of the light intercepted by the convex mirror 134. The light is reflected by the surface of the concave mirror 132 and then enters the convex mirror 134 as a focusing light beam. The light beam incident on the convex mirror 134 is reflected by the surface thereof to lower a degree of focusing. The light beam passes through the aperture in the concave mirror 132, and then enters the concave mirror 142, except for part of the light beam intercepted by the convex mirror 144. The light beam incident on the concave mirror 142 is reflected by the surface thereof and enters the convex mirror 144 as a focusing light beam. The light beam incident on the convex mirror 144 is reflected by the surface thereof to lower a degree of focusing. Then, the light beam passes through the aperture in the concave mirror 142 and is converged behind the concave mirror 142. Similarly, in this light converging means, the effective focal distance is lengthened, without lengthening the distance between the light converging means and its light converging point. Since the mirrors are used in place of lenses, no chromatic aberration occurs, and a light beam having a wider wavelength range can be used. Furthermore, like the lens system shown in FIG. 6, the lens system has a wider range of precision in processing and assembly of optical components, and the processing and assembly become easier under the same conditions.

Figure 9:
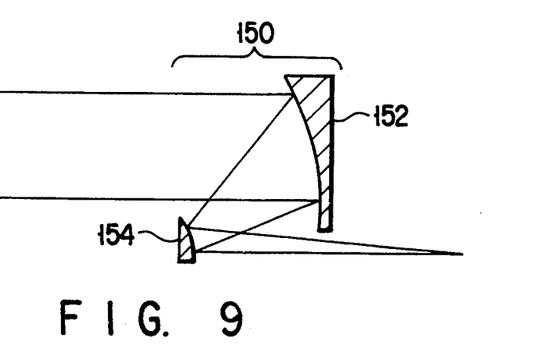
FIG. 9 is a view of a fourth modification to the condenser shown in FIG. 5.

A fourth modification to the light converging means used in the confocal optical system will be described, with reference to FIG. 9. The light converging means of the fourth modification includes a reflective lens 150 having a concave mirror 152 and a convex mirror 154 of a small diameter, as the reflective lens 130 shown in FIG. 7 does. However, the reflective lens 150 differs from the reflective lens 130 in that the central axes of the mirrors 152 and 154 deviate from the optical axis. The function of the reflective lens 150 is the same as that of the reflective lens 130 shown in FIG. 7.

Figure 10:
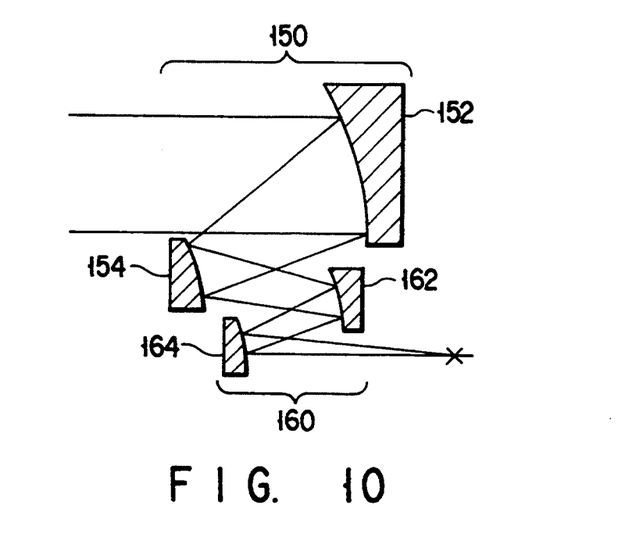
FIG. 10 is a view of a fifth modification to the condenser shown in FIG. 5.

A fifth modification to the light converging means used in the confocal optical system will be described, with reference to FIG. 10. The light converging means of the fifth modification includes a reflective lens 160 having a concave mirror 162 and a convex mirror 164 which is arranged behind the reflective lens 150 having concave and convex mirrors 152 and 154 in the light traveling direction. The function of the reflective lens 160 is the same as that of the reflective lens 130 shown in FIG. 8.

Figure 11:
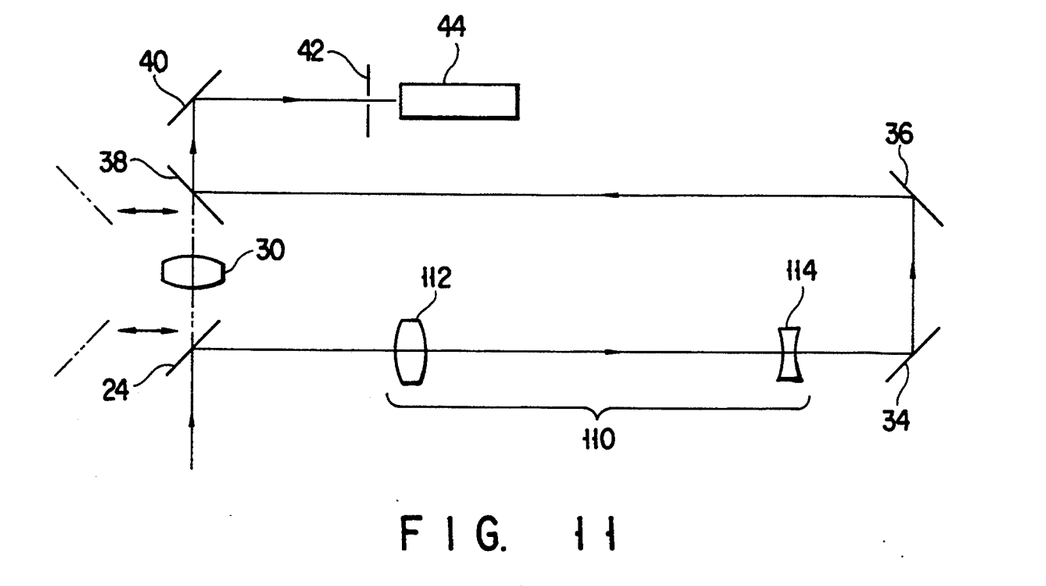
FIG. 11 is a view of a first modification to a selecting means for selecting one of the confocal and nonconfocal optical systems, through which light from a sample passes.

A first modification to the selecting means for selecting one of the confocal and nonconfocal optical systems through which a light beam emitted from a sample passes, will now be described, with reference to FIG. 11. In this first modification, the confocal optical system is the same as that of the above embodiment (FIG. 4), but the condenser 30 of a short focal distance is arranged between the mirrors 24 and 38, and these mirrors are movably provided and can thus be removed from the optical path when necessary. When the mirrors 24 and 38 are removed, a light beam passes through the condenser 30 and reaches the mirror 40. These two mirrors 24 and 38, which are detachably provided on the optical axis, constitute a selecting means. This selecting means allows the confocal and nonconfocal optical systems to be switched to each other, as in the embodiment described above. In the first modification, only the mirrors 24 and 38 are required as movable members, and neither of the mirrors 28 and 32 which are necessary for the above embodiment, are not required, with the result that the structure of the selecting means is simplified.

Figure 12:
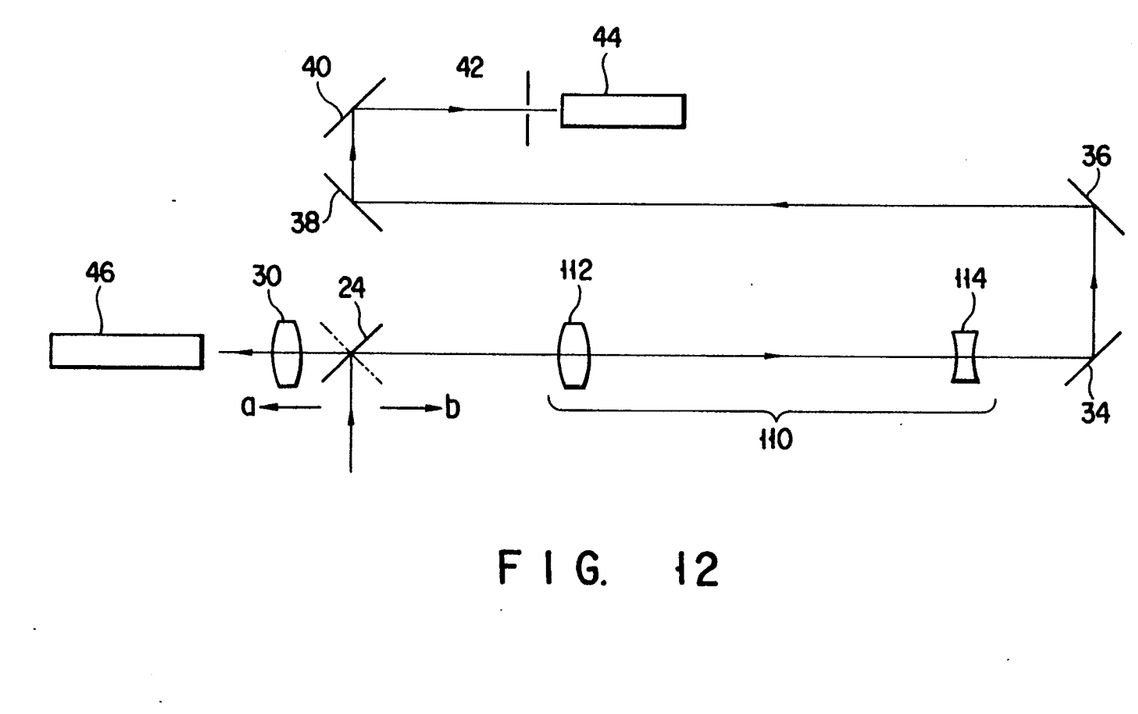
FIG. 12 is a view of a second modification to the selecting means.

A second modification to the selecting means will be described, with reference to FIG. 12. In the second modification, the mirror 24 is rotatably provided to selectively turn a light beam in the directions of arrows a and b in FIG. 12. The light beam turned in the direction a by the mirror 24 passes through the condenser 30 and enters a photomultiplier tube 46. The photomultiplier tube 46 can be arranged separately from the photomultiplier tube 44. Further, the photomultiplier tube 44 can be so constructed that it can be moved to the position of the photomultiplier tube 46 in FIG. 12, or the function of the photomultiplier tube 46 can be carried out by the photomultiplier tube 44 by guiding detection light from the position of the photomultiplier tube 46 to the photomultiplier tube 44 through an optical fiber or the like. Since, in general, the intensity of detection light is high in the nonconfocal optical system, the photomultiplier tube 46 can be replaced with a semiconductor element such as a photodiode. If a detector which is larger than the diameter of a light beam is used, the entire light beam can be received and, even if the condenser 30 of the short focal distance is not used, the nonconfocal optical system can be achieved.

Figure 13:
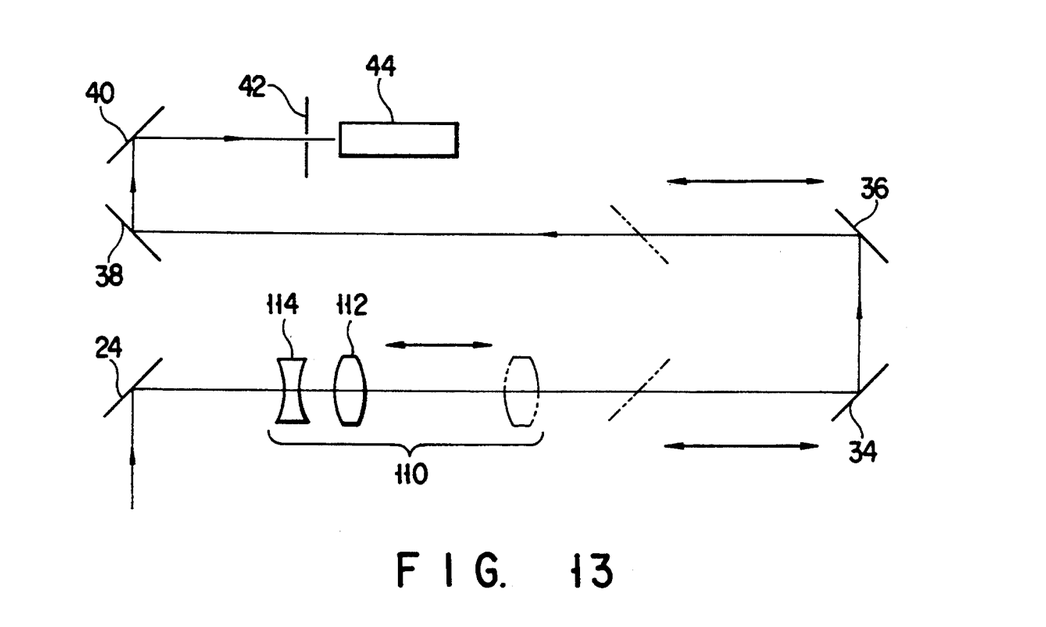
FIG. 13 is a view of a third modification to the selecting means.

A third modification to the selecting means will be described, with reference to FIG. 13. In the third modification, the optical system is basically the same as that of the foregoing embodiment, but the convex lens 112 of the condenser 110 is so arranged that it can be moved along the optical axis and its focal distance can be varied. The mirrors 34 and 36 whose normals are perpendicular to each other, can be moved together along the axis of the condenser 110. Further, these mirrors are moved so that a spot can be formed on the iris 42, in accordance with a variation in the focal distance of the condenser 110 due to the movement of the convex lens 112. Since the condenser 110 whose focal distance is variable fulfills both the functions of the condensers 30 and 110 shown in, for example, FIG. 4, the condenser 30 of the short distance is not required and the number of optical elements is decreased. The mirrors 34 and 36 are moved in the directions in FIG. 13 in association with a variation in the focal distance of the condenser 110, as described above. The concave lens 112 is moved to change the focal distance of the condenser 110. It is thus possible to continuously change the projection magnification of the spot. Therefore, the iris 42 is able to have a fixed diameter, and the diameter of the spot is continuously changed with respect to the aperture, with the result that the confocal effect can be continuously changed. FIG. 13 shows the condenser 110 whose focal distance can be varied by adjusting an interval between the concave and convex lenses. Needless to say, a variable-focal-length lens of liquid crystal or the like can be used in place of the condenser 110.

In the above embodiment, the mirrors are used as reflective optical elements to deflect a light beam. However, the mirrors can be replaced with total reflection prisms. Using the total reflection prisms, the following unavoidable drawbacks, which are caused when the mirrors are used, can be eliminated. If a large number of mirrors are used, the loss of luminous energy is increased because the reflectivity of each of the mirrors is about 90%. Further, this reflectivity is lowered as time passes. If the total internal reflection prisms are used, since the reflectivity is 100%, there is no loss of luminous energy, or the reflectivity is not lowered.

Modifications to the reflective optical element and their peripheral mechanisms will be described, with reference to the accompanying drawings. In these modifications, total reflection prisms are used in place of the mirrors.

Figure 14:
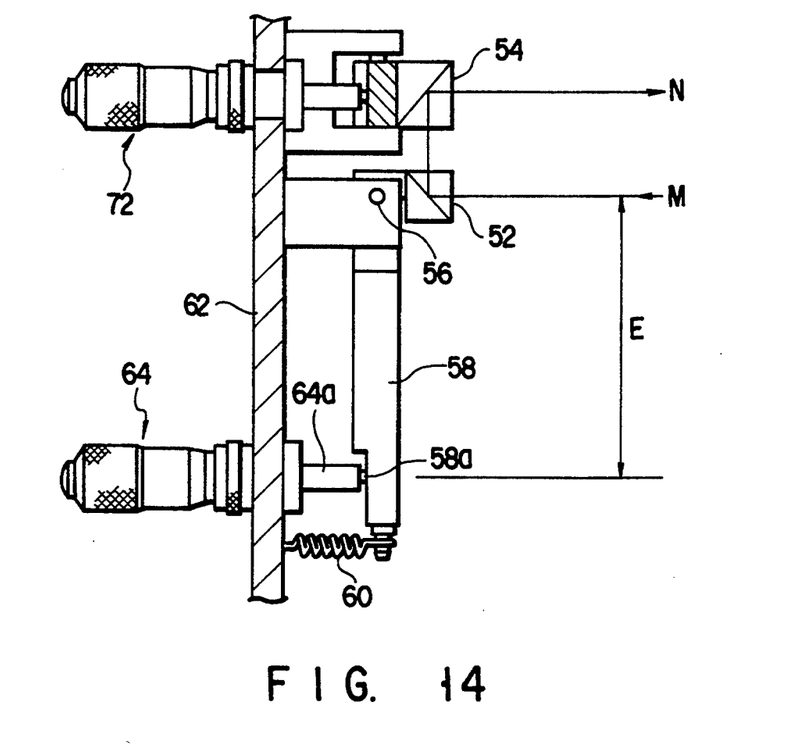
FIGS. 14 and 15 is a view showing a first modification to a mirror serving as a reflective optical element of the optical system shown in FIGS. 1–4, in which a total reflection prism is used in place of the mirror, and also showing its peripheral mechanism.
Figure 15:
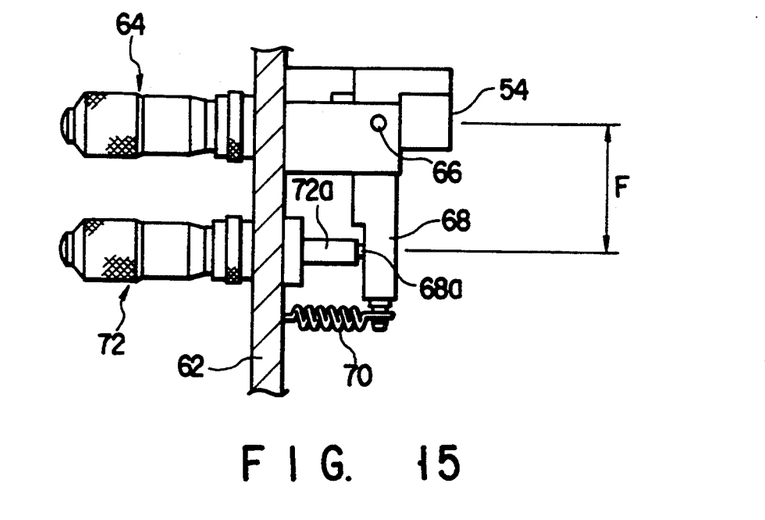

According to the first modification to the reflective optical element, as shown in FIG. 14, a light beam emitted from M is reflected by a total reflection prism 52 and then enters a total reflection prism 54. This light beam is reflected by the prism 54 and emitted in the direction of N. In order to cause the light beam to finally pass through the iris 42, the prisms 52 and 54 are shaken in the vertical and horizontal directions to adjust the position of the light beam. The prism 52 is attached to one end of a prism die 58 rotatably supported at a shaft 56. The other end of the prism die 58 is attached to one end of a spring 60 the other end of which is fixed on a support plate 62, and the prism die 58 is always pulled toward the support plate 62 by the tension of the spring 60. A micrometer head 64 mounted on the support plate 62 is rotated, and a spindle 64a is pressed on a point of application 58a of the prism die 58, with the result that the reflection plane of the prism 52 can be shaken. The total reflection prism 54 is attached to one end of a prism die 68 rotatably supported at a shaft 66, as shown in FIG. 15. The other end of the prism die 68 is attached to one end of a spring 70 the other end of which is fixed on the support plate 62, and the prism die 68 is always pulled toward the support plate 62 by the tension of the spring 70. A micrometer head 72 is operated, and a spindle 72a is pressed on a point of application 68a of the prism die 68, with the result that the reflection plane of the prism 54 can be shaken. Consequently, the reflection planes of the total reflection prisms 52 and 54 are shaken in the directions perpendicular to each other, and the position of the light beam can be adjusted. Since the ratio of shake angles of the prism dies 58 and 68 for shaking the light beams at the same angle in the prisms 52 and 54, is 1 to 2, if the distance from the shaft 56 of the prism die 58 to its point of application 58a and the distance from the shaft 66 of the prism die 68 to is point of application 68a are E and F, respectively, and E:F=2:1, then the amounts of shift of the spindles 64a and 72a of the micrometer heads 64 and 72 are the same.

Figure 16:
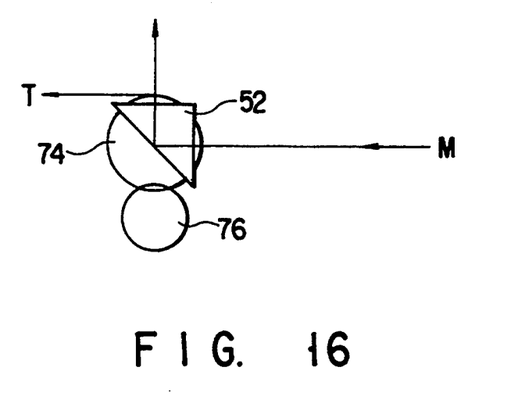
FIG. 16 is a view of a second modification to the reflective optical element and its peripheral mechanism.

A basic structure of the second modification to the reflective optical element is shown in FIG. 16. As shown in FIG. 16, a large gear 74 is attached to the total internal reflection prism 52 and engaged with a small gear 76. The reflection plane of the prism 52 can be shaken by rotating the small gear 76, and thus the emitting direction of a light beam from M can be shaken. Since, in this case, the backlash of these gears is removed, tension in the direction of arrow T or its opposite direction is applied to the large gear 74 using a coil spring, etc. FIG. 16 shows only the total internal reflection prism 52. If, however, the same mechanism is applied to the total internal reflection prism 54 and the prisms 52 and 54 are shaken in the directions in which their reflection planes are perpendicular to each other, the light beam can be directed to an arbitrary direction. If, furthermore, some gears are combined, the direction of the light beam can be minutely adjusted.

Figure 17:
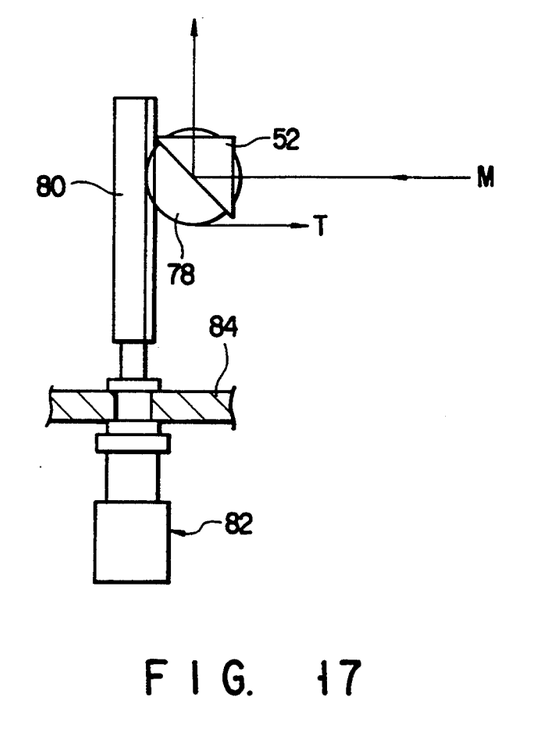
FIG. 17 is a view of a third modification to the reflective optical element and its peripheral mechanism.

The third modification to the reflective optical element is shown in FIG. 17. In this modification, basically, the gears of the second modification are replaced with a rack and a pinion. A pinion gear 78 is attached to the total internal reflection prism 52, and a rack gear 80 is slidably engaged with the pinion gear 78. The rack gear 80 is energized in the direction of a support member 84 by a coil spring, etc. (not shown). The rack gear 80 is pressed and moved by a spindle of a micrometer head 82 mounted on the support member 84. Thus, the pinion gear 78 is rotated and the reflection surface of the prism 52 is shaken. The emitting direction of a light beam from M is shaken in parallel to the plane of FIG. 17. In this third modification, tension is applied to the pinion gear 78 in the direction of arrow T or its opposite direction in order to remove the backlash of the gears.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scanning optical microscope for scanning a sample with a light beam to observe the sample, comprising:
   a light source for emitting a light beam;
   focusing means for focusing the light beam from said light source to the sample to form a light spot on the sample;

scanning means for scanning the light spot across the sample;

first light converging means for converging the light beam from the sample, said first light converging means including a first pair of optical elements, one optical element of said first pair having a positive power and the other optical element of said first pair having a negative power, and a second pair of optical elements, one optical element of said second pair having a positive power and the other optical element of said second pair having a negative power;

aperture means arranged in conjugation with the light spot and including an aperture having a diameter which allows a light beam from a minute spot on a focal plane of a lens to selectively pass through the aperture;

first detecting means for detecting the light beam passing through the aperture of said aperture means; and image forming means for forming an image based on information from said scanning means and said first detecting means.

2. The scanning optical microscope according to claim 1, wherein said optical elements of said first and second pairs of optical elements comprise lenses.

3. The scanning optical microscope according to claim 1, wherein said optical elements of said first and second pairs of optical elements comprise mirrors.

4. A scanning optical microscope for scanning a sample with a light beam to observe the sample, comprising:
a light source for emitting a light beam;
focusing means for focusing the light beam from said light source to the sample to form a light spot on the sample;
scanning means for scanning the light spot across the sample;
first light converging means for converging the light beam from the sample, said first light converging means including a least three pairs of optical elements, one optical element of each of said pairs of optical elements having a positive power and the other optical element of each of said pairs of optical elements having a negative power;
aperture means arranged in conjugation with the light spot and including an aperture having a diameter which allows a light beam from a minute spot on a focal plane of a lens to selectively pass through the aperture;
first detecting means for detecting the light beam passing through said aperture of said aperture means; and
image forming means for forming an image based on information from said scanning means and said first detecting means.

5. A scanning optical microscope for scanning a sample with a light beam to observe the sample, comprising:
a light source for emitting a light beam;
focusing means for focusing the light beam from said light source to the sample to form a light spot on the sample;
scanning means for scanning the light spot across the sample;
first light converging means for converging the light beam from the sample, said first light converging means including a pair of optical elements, one optical element of said pair of optical elements having a positive power and the other optical element of said pair of optical elements having a negative power;
aperture means arranged in conjugation with the light spot and including an aperture having diameter which allows a light beam from a minute spot on a focal plane of a lens to selectively pass through the aperture, said aperture means including means for steplessly varying the diameter of the aperture to allow only the light from the minute spot on the focal plane to selectively pass therethrough;
first detecting means for detecting the light beam passing through said aperture of said aperture means; and
image forming means for forming an image based on information from said scanning means and said first detecting means.

6. A scanning optical microscope for scanning a sample with a light beam to observe the sample, comprising:
a light source for emitting a light beam;
focusing means for focusing the light beam from said light source to the sample to form a light spot on the sample;
scanning means for scanning the light spot across the sample;
first light converging means for converging the light beam from the sample, said first light converging means including a pair of optical elements, one optical element of said pair of optical elements having a positive power and the other optical element of said pair of optical elements having a negative power;
second light converging means for converging a light beam from the sample, said second light converging means having a focal distance which is shorter than that of said first light converging means;
selecting means for allowing the light beam from the sample to selectively pas through one of said first and second light converging means;
aperture means arranged in conjugation with the light spot and including an aperture having a diameter which allows a light beam from a minute spot on a focal plane of a lens to selectively pass through the aperture;
first detecting means for detecting the light beam passing through said aperture of said aperture means; and
image forming means for forming an image based on information from said scanning means and said first detecting means.

7. The scanning optical microscope according to claim 6, wherein said first and second light converging means have respective optical paths overlapping each other, and optical axes of said first and second light converging means coincide with each other immediately before the optical axes reach said first detecting means.

8. The scanning optical microscope according to claim 7, wherein said second light converging means includes a lens, and said selecting means includes reflective optical elements which are removably provided in the optical path.

9. The scanning optical microscope according to claim 8, wherein said lens is removably provided in the optical path, together with the reflective optical elements.

10. The scanning optical microscope according to claim 7, wherein said first and second light converging means include a common optical element, said, optical element comprising a lens, said selecting means comprises a lens which is relatively movable along a direction of the optical axis and a pair of mirrors movably arranged along a direction of an axis of the lens, and said mirrors have normals perpendicular to each other and reflect a light beam from the lens in an opposite direction.

11. The scanning optical microscope according to claim 6, wherein said selecting means includes a mirror whose normal is variable, said second light converging means includes a lens whose focal point differs from that of the first light converging means, said scanning optical microscope further comprises second detecting means for detecting the light from the lens, and said image forming means includes means for forming an image based on information from the second detecting means.

* * * * *